Patented Apr. 15, 1924.

1,490,499

UNITED STATES PATENT OFFICE.

ARTHUR ZART AND LEONHARD MONKEMEYER, OF OBERBRUCH, GERMANY, ASSIGNORS TO VEREINIGTE GLANZSTOFF-FABRIKEN A.-G., OF ELBERFELD, GERMANY.

PROCESS FOR WORKING UP COPPER CELLULOSE SLUDGE.

No Drawing.     Application filed October 20, 1923. Serial No. 669,953.

*To all whom it may concern:*

Be it known that we, ARTHUR ZART and LEONHARD MONKEMEYER, of Oberbruch, Germany, citizens of the German Empire, have invented certain new and useful Improvements in Processes for Working Up Copper Cellulose Sludge, of which the following is a specification.

When it acts on wood pulp and cellulose, caustic soda solution dissolves out organic substances therefrom. These organic substances can be precipitated from the waste liquor by the addition of salts of heavy metals such as copper sulphate. After the liquor has been expressed from the sludge this latter forms a troublesome waste with which valuable substances such as soda and copper are lost in a form which it has hitherto been impossible to make use of or from which they can only be usefully recovered by complicated methods. Our invention consists of a method of working up this sludge and by which the copper in form of oxide and soda can be recovered in a surprisingly simple manner. The method consists in heating the sludge in autoclaves for a definite length of time, say three hours for example, at three atmospheres. Under this treatment the organic constituent of the precipitate passes into solution and the copper is completely precipitated as cuprous oxide. A liquor is obtained, which notwithstanding its brown colour can be used quite well for many purposes, and all the copper is recovered from the residue in the form of cuprous oxide. If the pressure is lower the heating must be correspondingly prolonged. When high pressures are used the time of the heating may be curtailed.

We claim:

1. The method of recovering soda and copper from soda-cellulose sludges containing copper, which comprises heating the sludges to simultaneously dissolve organic constituents and precipitate their metallic content, and separating the solution containing soda.

2. The method of recovering soda and copper from soda-cellulose waste liquor sludges containing copper, which comprises heating the sludges in autoclaves under pressure above atmospheric pressure to simultaneously dissolve their organic constituents, and precipitate copper as cuprous oxide, and separating the solution containing soda.

In testimony that we claim the foregoing as our invention, we have signed our names to this specification.

ARTHUR ZART.
LEONHARD MONKEMEYER.